United States Patent
Tokozakura et al.

(10) Patent No.: US 9,371,888 B2
(45) Date of Patent: Jun. 21, 2016

(54) TOOTHED WHEELS AND TRANSMISSION

(71) Applicants: Daisuke Tokozakura, Susono (JP); Akira Murakami, Gotenba (JP); Yuya Takahashi, Susono (JP); Keisuke Ichige, Nagoya (JP); Masanori Iritani, Nagoya (JP); Hideyuki Suzuki, Nisshin (JP)

(72) Inventors: Daisuke Tokozakura, Susono (JP); Akira Murakami, Gotenba (JP); Yuya Takahashi, Susono (JP); Keisuke Ichige, Nagoya (JP); Masanori Iritani, Nagoya (JP); Hideyuki Suzuki, Nisshin (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 14/350,986

(22) PCT Filed: Oct. 5, 2012

(86) PCT No.: PCT/IB2012/001969
§ 371 (c)(1),
(2) Date: Apr. 10, 2014

(87) PCT Pub. No.: WO2013/054166
PCT Pub. Date: Apr. 18, 2013

(65) Prior Publication Data
US 2014/0326092 A1    Nov. 6, 2014

(30) Foreign Application Priority Data

Oct. 11, 2011 (JP) .................. 2011-224198

(51) Int. Cl.
*F16H 55/08* (2006.01)
*F16H 1/04* (2006.01)
*F16H 55/06* (2006.01)
*F16H 57/04* (2010.01)
*F16H 3/08* (2006.01)

(52) U.S. Cl.
CPC .. *F16H 1/04* (2013.01); *F16H 3/08* (2013.01); *F16H 55/06* (2013.01); *F16H 57/0431* (2013.01); *Y10T 74/19219* (2015.01); *Y10T 74/19642* (2015.01)

(58) Field of Classification Search
USPC .................................... 74/325, 457, 458, 468
See application file for complete search history.

(56) References Cited

U.S. PATENT DOCUMENTS

| | | | | |
|---|---|---|---|---|
| 2,075,995 | A | * 4/1937 | Morgan | .......................... 74/434 |
| 3,206,996 | A | * 9/1965 | Shimp | ..................... F16H 55/17 37/97 |
| 3,405,580 | A | * 10/1968 | Hallden | ................. B26D 1/626 464/119 |

(Continued)

FOREIGN PATENT DOCUMENTS

| | | |
|---|---|---|
| JP | 9-302454 | 11/1997 |
| JP | 2004-345022 | 12/2004 |
| JP | 2005-201295 | 7/2005 |

*Primary Examiner* — Ha D Ho
(74) *Attorney, Agent, or Firm* — Finnegan, Henderson, Farabow, Garrett & Dunner, LLP

(57) ABSTRACT

A pair of toothed wheels that mesh with each other includes a plateau portion. The surface of the plateau portion is a plateau-structure surface formed on each tooth face of each of the pair of the toothed wheels, with peak portions of convexities, out of a plurality of concavities and the convexities provided on the each tooth face, being flat. A reduced valley depth Rvk of the plateau portion of one of the pair of the toothed wheels as defined in JISB0671-2 is greater than the reduced valley depth Rvk of the plateau portion of the other of the pair of the toothed wheels. The area occupied by the concavities in the plateau portion of the one of the toothed wheels is larger than the area occupied by the concavities in the plateau portion of the other toothed wheel.

8 Claims, 7 Drawing Sheets

(56) References Cited

U.S. PATENT DOCUMENTS

| | | | | |
|---|---|---|---|---|
| 3,563,108 A * | 2/1971 | Wydler | | 74/458 |
| 4,187,735 A * | 2/1980 | Terry | | F16H 1/06 74/410 |
| 4,372,176 A * | 2/1983 | Terry | | 74/409 |
| 4,589,300 A * | 5/1986 | Rouverol | | F16H 55/08 74/457 |
| 4,679,458 A * | 7/1987 | Brandenstein et al. | | 74/458 |
| 4,679,459 A * | 7/1987 | F'Geppert | | F16H 1/206 74/460 |
| 6,526,849 B1 * | 3/2003 | Ishikawa | | 74/640 |
| 7,036,392 B2 * | 5/2006 | Eldally | | 74/437 |
| 7,111,395 B2 * | 9/2006 | Sandner | | 29/893.3 |
| 7,526,977 B2 * | 5/2009 | Masui | | 74/462 |
| 8,100,027 B2 * | 1/2012 | Sato | | B24B 31/003 74/434 |
| 8,967,012 B2 * | 3/2015 | Napau et al. | | 74/457 |

\* cited by examiner

TOOTHED WHEELS AND TRANSMISSION

CROSS-REFERENCE TO RELATED APPLICATIONS

This application is a national phase application of International Application No. PCT/IB2012/001969, filed Oct. 5, 2012, and claims the priority of Japanese Application No. 2011-224198, filed Oct. 11, 2011, the content of both of which is incorporated herein by reference.

BACKGROUND OF THE INVENTION

1. Field of the Invention

The invention relates to a pair of toothed wheels that mesh with each other, and a transmission that is equipped with the toothed wheels.

2. Description of Related Art

There are known toothed wheels whose tooth faces are treated. For example, there are known toothed wheels having micro dimples that are formed by subjecting tooth faces of the toothed wheels to a shot peening treatment to cause high-hardness particles to collide with the tooth faces at high speed and thus plastically deforming the tooth faces slightly (see Japanese Patent Application Publication No. 2005-201295 (JP-2005-201295 A)). In addition, the related art documents associated with the invention include Japanese Patent Application Publication No. 09-302454 (JP-09-302454 A) and Japanese Patent Application Publication No. 2004-345022 (JP-2004-345022 A).

In the toothed wheels of Japanese Patent Application Publication No. 2005-201295 (JP-2005-201295 A), convexities are formed on each tooth face thereof. Thus, the lubrication state at the time when the toothed wheels are meshed with each other may be under the influence of the friction between the convexities thereof. Besides, in this case, the oil accumulated in the dimples may not be utilized. Thus, the toothed wheels of Japanese Patent Application Publication No. 2005-201295 (JP-2005-201295 A) may have a narrow operating region where the friction coefficient is low.

SUMMARY OF THE INVENTION

The invention provides toothed wheels that make it possible to enlarge an operating region where the friction coefficient between tooth faces is low, and a transmission that is equipped with the toothed wheels.

Toothed wheels according to a first aspect of the invention relate to a pair of toothed wheels that mesh with each other. These toothed wheels includes a plateau portion whose surface is a plateau-structure surface formed on each tooth face of each of the pair of the toothed wheels, with peak portions of convexities, out of a plurality of concavities and the convexities provided on the each tooth face, being flat. A reduced valley depth of the plateau portion of one of the pair of the toothed wheels as defined in JISB0671-2 is greater than the reduced valley depth of the plateau portion of the other of the pair of the toothed wheels. An area occupied by the concavities in the plateau portion of the one of the toothed wheels is larger than an area occupied by the concavities in the plateau portion of the other toothed wheel.

The reduced valley depth Rvk is correlated with the average of the depth of the concavities of the plateau portion. Thus, the average of the depth of the concavities in the plateau portion of the one of the toothed wheels is greater than the average of the depth of the concavities in the plateau portion of the other toothed wheel. Accordingly, the depth of the concavities in the plateau portion is greater, and the number of concavities is larger in the one of the toothed wheels than in the other toothed wheel. Since oil enters the concavities, a larger amount of oil is retained by the one of the toothed wheels than by the other toothed wheel. In addition, when the pressure applied to the tooth faces becomes high, this oil in the concavities is discharged and supplied to the gaps between the tooth faces. In general, the pressure applied to the tooth face becomes high when the toothed wheels rotate at low rotational speed and with high torque. Thus, in the aforementioned toothed wheels, oil is supplied from the concavities in the one of the toothed wheels to the gaps between the tooth faces in such an operating region, so that the friction coefficient between the tooth faces in this operating region can be reduced.

Besides, in the aforementioned toothed wheels, the number of concavities in the plateau portion of the other toothed wheel is smaller than the number of concavities in the plateau portion of the one of the toothed wheels. Thus, the area occupied by the convexities is larger than the area occupied by the concavities in the plateau portion of the other toothed wheel. On the plateau-structure surface, the peak portions of the convexities are flat. Therefore, the number of concavities and convexities along each tooth face of the other toothed wheel is smaller than the number of concavities and convexities along each tooth face of the one of the toothed wheels. An oil film can be appropriately formed on such a tooth face. Therefore, the friction coefficient at the time when the toothed wheels rotate at high rotational speed and with low torque can be reduced. Accordingly, in the aforementioned toothed wheels, the friction coefficient between the tooth faces can be reduced in such an operating region as well. In this manner, according to the aforementioned toothed wheels, the friction coefficient between the tooth faces can be reduced from the operating region where the toothed wheels rotate at low rotational speed and with high torque to the operating region where the toothed wheels rotate at high rotational speed and with low torque. Thus, the friction loss can be reduced, and therefore, the transmission efficiency of torque can be enhanced.

In the aforementioned toothed wheels, reduced peak heights of both the plateau portion of the one of the toothed wheels and the plateau portion of the other, toothed wheel as defined in JISB0671-2 may be smaller than 1.0 μm. The reduced peak height Rpk is correlated with the number of convexities that protrude more than the other convexities on the plateau portion. In this configuration, the reduced peak height Rpk of the plateau portion of each of the toothed wheels is made smaller than 1.0 μm. Therefore, the height of the convexities on the plateau portion of each of the toothed wheels can be made homogeneous. Thus, when the tooth faces mesh with each other, one of the tooth faces can be restrained from being chipped by the other tooth face, so that the surface quality of the tooth faces is unlikely to change. In this case, the surface quality hardly changes due to the running-in of the tooth faces. Therefore, a low friction coefficient can be maintained since the beginning of use. Besides, the surface quality can be restrained from changing. Therefore, the plateau-structure surface of each of the plateau portions can be maintained.

In the aforementioned toothed wheels, a hardness of teeth of the one of the toothed wheels may be equal to a hardness of teeth of the other toothed wheel. In this case, the teeth of the one of the toothed wheels can be restrained from being chipped by the teeth of the other toothed wheel. Thus, the surface quality of the tooth faces can be made more unlikely to change. Accordingly, the plateau-structure surface of each of the plateau portions can longer be maintained.

The area occupied by the concavities in the plateau portion may be an area other than the area of the peak portions of the plateau portion.

A second aspect of the invention relates to a transmission. This transmission is equipped with an input shaft, an output shaft, and a plurality of gear pairs that are interposed between the input shaft and the output shaft and are different in speed ratio from each other. The input shaft is provided with one of toothed wheels of each of the plurality of gear pairs. The output shaft is provided with the other toothed wheel of each of the plurality of the gear pairs such that the other toothed wheel meshes with the one toothed wheel. A changeover in speed ratio is made by selectively achieving transmission of rotation by one of the plurality of the gear pairs. The aforementioned toothed wheels are provided as at least one of the plurality of the gear pairs.

According to the aforementioned transmission, rotation can be transmitted between the input shaft and the output shaft by the aforementioned toothed wheels. Thus, the friction loss can be reduced. Besides, the transmission efficiency of torque can be enhanced.

In the aforementioned transmission, the plurality of the gear pairs may include a gear pair at an intermediate shift speed, a gear pair at a low shift speed which is higher in speed ratio than the gear pair at the intermediate shift speed, and a gear pair at a high shift speed which is lower in speed ratio than the gear pair at the intermediate shift speed. The toothed wheels may be provided as the gear pair at the intermediate shift speed. In general, the intermediate shift speed is used in a wider rotational speed range ranging from low rotational speed to high rotational speed than the low shift speed and the high shift speed. Besides, the range of the torque to be transmitted between the toothed wheels is wide as well. The toothed wheels in accordance with the invention make it possible to reduce the friction coefficient between the tooth faces in such a wide operating region. Thus, according to this configuration, the friction loss of the gear pair at the intermediate shift speed can be reduced in an entire operating region of the intermediate shift speed.

In this configuration, the plateau portion may include a first plateau portion and a second plateau portion. The first plateau portion may be provided on each tooth face of each toothed wheel of the gear pair at the low shift speed. The second plateau portion may be provided on each tooth face of each toothed wheel of the gear pair at the high shift speed. The reduced valley depth of the first plateau portion may be greater than a predetermined value, and an area occupied by concavities in the first plateau portion may be larger than an area occupied by the peak portions of the convexities on the first plateau portion. The reduced valley depth of the second plateau portion may be smaller than the predetermined value, and an area occupied by the peak portions of the convexities on the second plateau portion may be larger than an area occupied by the concavities in the second plateau portion. In general, the gear pair at the low shift speed is highly frequently used when the rotational speed of the input shaft is low and the torque to be transmitted between the toothed wheels is large. In the toothed wheels having the plateau portion whose concavities are great in depth and large in number as described above, the friction coefficient between the tooth faces in the operating region where the toothed wheels rotate at low rotational speed and with high torque can be reduced. In this configuration, such toothed wheels are applied as the gear pairs at the low shift speed. Therefore, the friction loss of the gear pair at the low shift speed can be appropriately reduced. Besides, in general, the gear pair at the high shift speed is highly frequently used when the rotational speed of the input shaft is high and the torque to be transmitted between the toothed wheels is small. In the toothed wheels having the plateau portion whose convexities have peak portions occupying a large area as described above, the friction coefficient between the tooth faces in the operating region where the toothed wheels rotate at high rotational speed and with low torque can be reduced. In this configuration, such toothed wheels are applied as the gear pairs at the high shift speed. Therefore, the friction loss of the gear pair at the high shift speed can be appropriately reduced. In this manner, this configuration makes it possible to reduce the friction loss of the gear pair at the low shift speed and the friction loss of the gear pair at the high shift speed as well, and hence to reduce the friction losses at all the shift speeds of the transmission respectively. Thus, the transmission efficiency of torque of the transmission can be enhanced.

As described above, according to each of the aspects of the invention, the friction coefficient between the tooth faces can be reduced in a wide operating region ranging from the operating region where the toothed wheels rotate at low rotational speed and with high torque to the operating region where the toothed wheels rotate at high rotational speed and with low torque. Thus, the friction loss can be reduced. Therefore, the transmission efficiency of torque can be enhanced.

BRIEF DESCRIPTION OF THE DRAWINGS

Features, advantages, and technical and industrial significance of an exemplary embodiment of the invention will be described below with reference to the accompanying drawings, in which like numerals denote like elements, and wherein.

DETAILED DESCRIPTION OF EMBODIMENT

Figure 1:
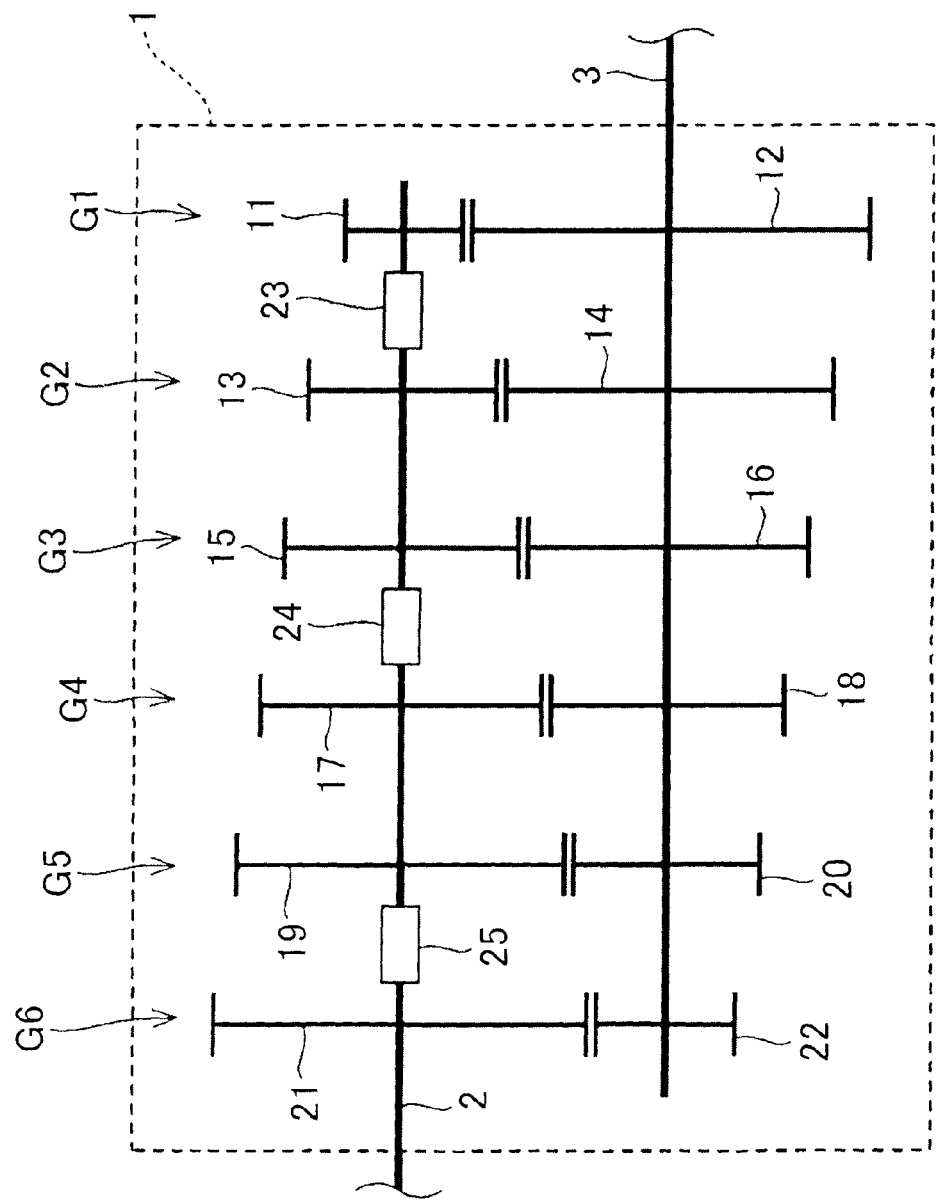
FIG. 1 is a view schematically showing a transmission in which toothed wheels according to one embodiment of the invention are incorporated.

FIG. 1 schematically shows a transmission in which toothed wheels according to one embodiment of the invention is incorporated. A transmission 1 is a well-known device that is mounted on a vehicle to change the speed of rotation of a traveling power source such as an internal combustion engine or the like and transmit the rotation to driving wheels. The transmission 1 has six forward shift speeds.

The transmission 1 is equipped with an input shaft 2 and an output shaft 3. The input shaft 2 and the output shaft 3 are arranged parallel to each other. First to sixth gear pairs G1 to G6 are provided between the input shaft 2 and the output shaft 3. The first gear pair G1 is composed of a first drive gear 11 and a first driven gear 12 that mesh with each other. The second gear pair G2 is composed of a second drive gear 13 and a second driven gear 14 that mesh with each other. The third gear pair G3 is composed of a third drive gear 15 and a third driven gear 16 that mesh with each other. The fourth gear pair G4 is composed of a fourth drive gear 17 and a fourth driven gear 18 that mesh with each other. The fifth gear pair G5 is composed of a fifth drive gear 19 and a fifth driven gear 20 that mesh with each other. The sixth gear pair G6 is composed of a sixth drive gear 21 and a sixth driven gear 22 that mesh with each other. Each of the first to sixth gear pairs G1 to G6 is provided such that the drive gear thereof and the driven gear thereof constantly mesh with each other.

The shift speeds set for the respective gear pairs G1 to G6 are different from one another. The shift speeds are so set as to decrease in the order of the first gear pair G1, the second gear pair G2, the third gear pair G3, the fourth gear pair G4, the fifth gear pair G5, and the sixth gear pair G6. Hence, the first gear pair G1 is a first-speed gear pair, and the second gear pair G2 is a second-speed gear pair. Besides, the third gear pair G3 is a third-speed gear pair, and the fourth gear pair G4 is a fourth-speed gear pair. In addition, the fifth gear speed G5 is a fifth-speed gear pair, and the sixth gear pair G6 is a sixth-speed gear pair. The first to sixth drive gears 11, 13, 15, 17, 19, and 21 are supported by the input shaft 2 relatively rotatably with respect to the input shaft 2. On the other hand, the first to sixth driven gears 12, 14, 16, 18, 20, and 22 are so fixed to the output shaft 3 as to rotate integrally with the output shaft 3. Incidentally, although not shown in the drawing, the transmission 1 is also provided with a backward gear train for causing the input shaft 2 and the output shaft 3 to rotate in the same direction.

The input shaft 2 is provided with first to three sleeves 23 to 25. The first to third sleeves 23 to 25 are so supported by the input shaft 2 as to be rotatable integrally with the input shaft 2 and movable in the direction of an axis of rotation. As shown in this drawing, the first sleeve 23 is arranged between the first drive gear 11 and the second drive gear 13. The first sleeve 23 is so provided as to be changeable over to a first-speed position at which the input shaft 2 and the first drive gear 11 are connected to each other, a second-speed position at which the input shaft 2 and the second drive gear 13 are connected to each other, and a release position at which the input shaft 2 is separated from both the first drive gear 11 and the second drive gear 13. The second sleeve 24 is provided between the third drive gear 15 and the fourth drive gear 17. The second sleeve 24 is so provided as to be changeable over to a third-speed position at which the input shaft 2 and the third drive gear 15 are connected to each other, a fourth-speed position at which the input shaft 2 and the fourth drive gear 17 are connected to each other, and a release position at which the input shaft 2 is separated from both the third drive gear 15 and the fourth drive gear 17. The third sleeve 25 is provided between the fifth drive gear 19 and the sixth drive gear 21. The third sleeve 25 is so provided as to be changeable over to a fifth-speed position at which the input shaft 2 and the fifth drive gear 19 are connected to each other, a sixth-speed position at which the input shaft 2 and the sixth drive gear 21 are connected to each other, and a release position at which the input shaft 2 is separated from both the fifth drive gear 19 and the sixth drive gear 21. These sleeves 23 to 25 are operated such that the input shaft 2 is selectively connected to one of the first to sixth drive gears 11, 13, 15, 17, 19, and 21. Thus, the transmission of rotation by one of the first to sixth gear pairs G1 to G6 is selectively achieved to make a changeover in speed ratio.

Figure 2:
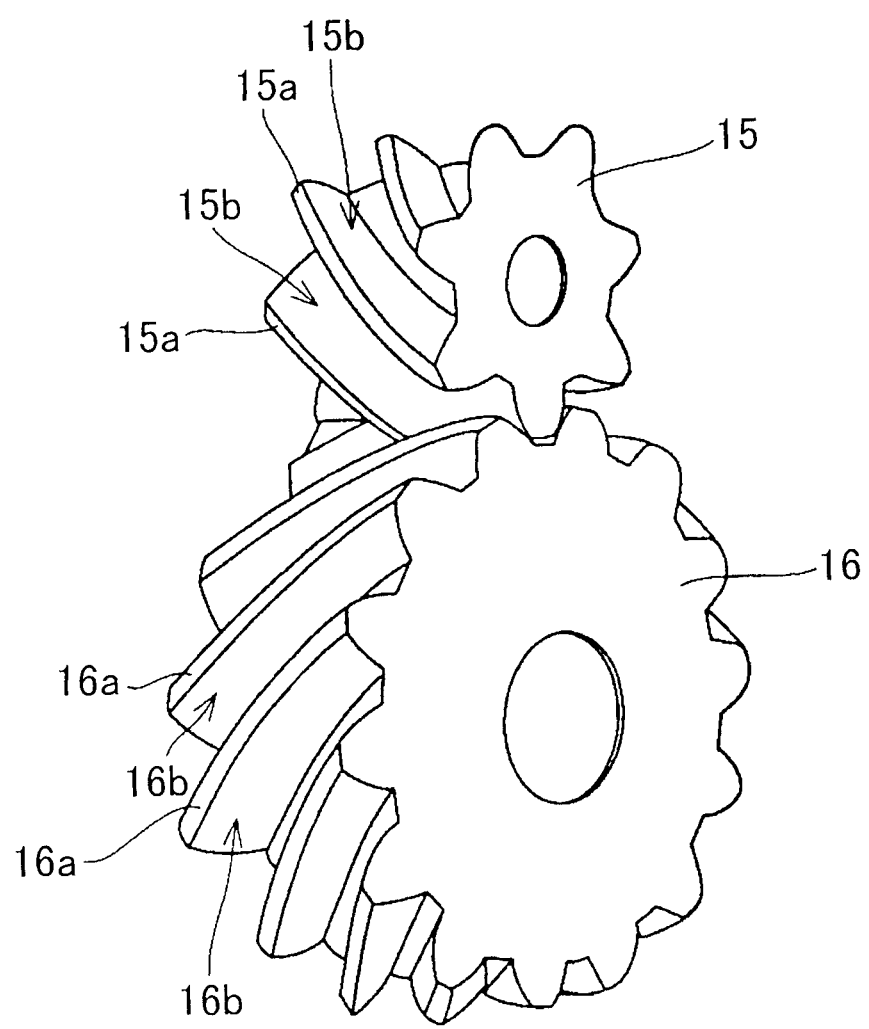
FIG. 2 is a view showing a third gear pair on an enlarged scale.
Figure 3:
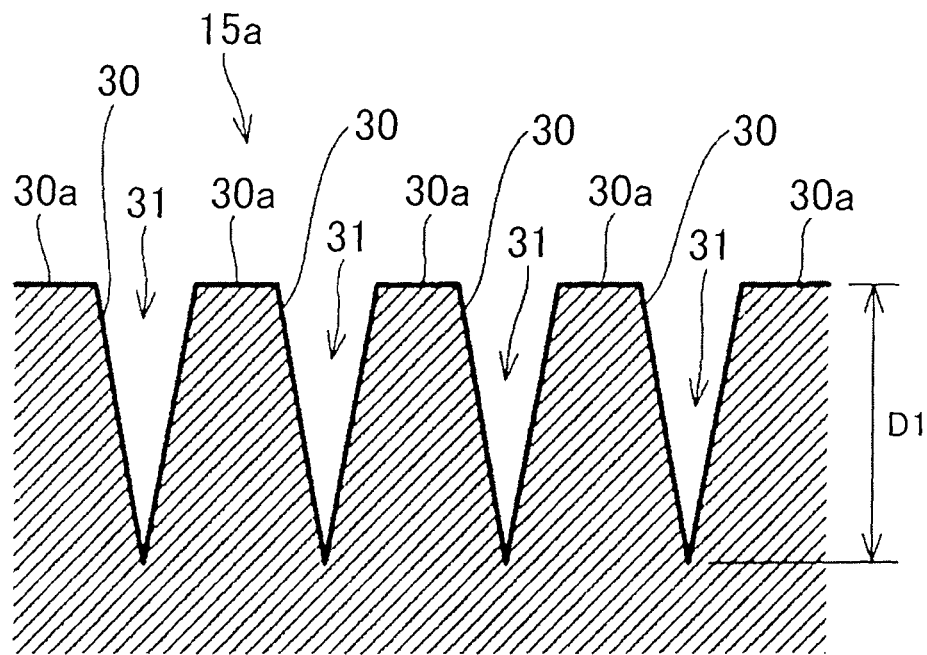
FIG. 3 is a view showing a tooth face of a third drive gear on an enlarged scale.
Figure 4:
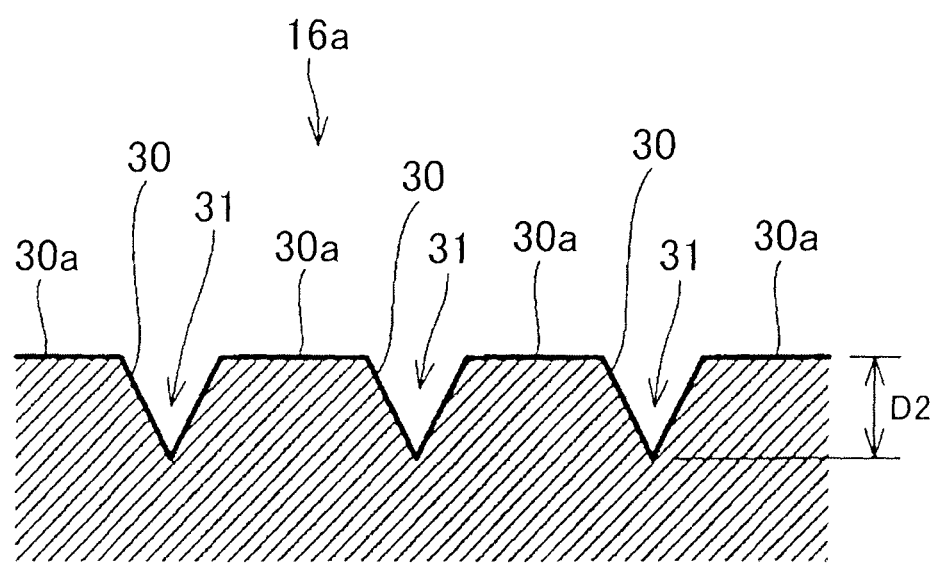
FIG. 4 is a view showing a tooth face of a third driven gear on an enlarged scale.

FIG. 2 shows the third gear pair G3 on an enlarged scale. As shown in this drawing, both the third drive gear 15 and the third driven gear 16 are helical gears. These gears 15 and 16 are both made of thermally treated iron. Thus, the teeth of these gears 15 and 16 are identical in hardness. Incidentally, as is the case with this third gear pair G3, the drive gears and driven gears of the other gear pairs are also helical gears that are made of thermally treated iron. A tooth face 15b of each tooth 15a of the third drive gear 15 is treated such that the surface thereof becomes a plateau-structure surface. The entire tooth face 15b is subjected to this treatment. FIG. 3 shows part of the tooth face 15b on an enlarged scale. As shown in this drawing, the tooth face 15b is provided with a plurality of concavities and convexities. In addition, tips of respective convexities 30, which constitute part of these concavities and convexities, are removed such that peak portions 30a of the convexities 30 become identical in height. Thus, the peak portions 30a of the convexities 30 are flat on the tooth face 15b. Hereinafter, the peak portions 30a of these convexities 30 may be referred to as smooth portions. The plateau-structure surface is a surface that is thus provided with a plurality of concavities and convexities, with tips of the convexities 30, which constitute part of the concavities and the convexities, removed. The plateau-structure surface as described above may be worked according to a well-known treatment method, for example, a shot peening treatment, a laser machining treatment, an etching treatment, or the like. As shown in FIG. 4, a tooth face 16b of each tooth 16a of the third driven gear 16 is also subjected to a treatment such that the surface thereof becomes a plateau-structure surface. By the same token, the entire tooth face 16b of the third driven gear 16 is also subjected to the treatment.

Figure 5:
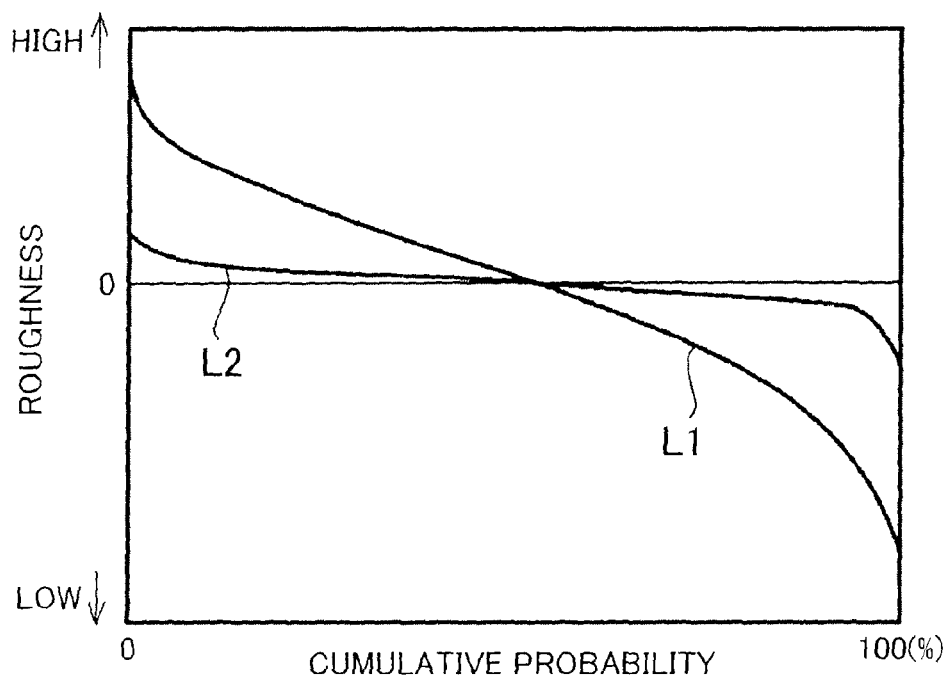
FIG. 5 is a view showing load curves of respective roughness curves of the tooth face of the third drive gear and the tooth face of the third driven gear.

FIG. 5 shows load curves of respective roughness curves of the tooth face 15b of the third drive gear 15 and the tooth face 16b of the third driven gear 16. Incidentally, each of the roughness curves is a curve defined in JISB0671-1 of Japanese Industrial Standards (corresponding to ISO13565-1), and each of the load curves is a curve described in JISB0671-2 (corresponding to ISO13565-2). Incidentally, each of the roughness curves may be drawn on the basis of a measurement result obtained from a measurement conducted by a well-known sensing pin-type or laser probe-type measuring machine. In this drawing, a solid line L1 indicates the load curve of the tooth face 15b of the third drive gear 15, and a solid line L2 indicates the load curve of the tooth face 16b of the third driven gear 16. As is apparent from this drawing, the tooth face 15b of the third drive gear 15 is provided with concavities and convexities that are larger than those of the tooth face 16b of the third driven gear 16. Thus, an average D1 (see FIG. 3) of the depth of concavities 31 in the tooth face 15b of the third drive gear 15 is greater than an average D2 (see FIG. 4) of the depth of the concavities 31 in the tooth face 16b of the third driven gear 16. Besides, if a comparison in reduced valley depth Rvk defined in JISB0671-2 is made, the reduced valley depth Rvk of the tooth face 15b of the third drive gear 15 is greater than the reduced valley depth Rvk of the tooth face 16b of the third driven gear 16. As for a reduced peak height Rpk defined in JISB0671-2, both the reduced peak height Rpk of the tooth face 15b of the third drive gear 15 and the reduced peak height Rpk of the tooth face 16b of the third driven gear 16 are smaller than 1.0 μm. Incidentally, the reduced peak heights Rpk of the respective tooth faces 15b and 16b are desired to be smaller than 0.1 µm.

Figure 6:
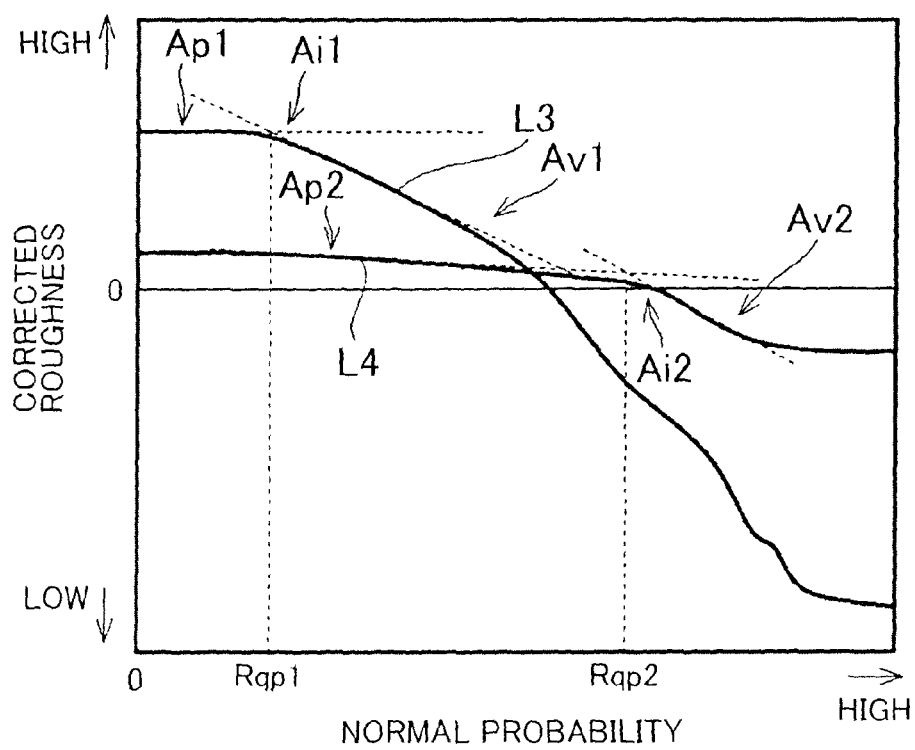
FIG. 6 is a view showing respective load curves of the tooth face of the third drive gear and the tooth face of the third driven gear on a normal probability paper.

FIG. 6 shows respective load curves of the tooth face 15b of the third drive gear 15 and the tooth face 16b of the third driven gear 16 on a normal probability paper on the basis of JISB0671-3 (ISO13565-3). Incidentally, in this drawing, a solid line L3 indicates the load curve of the tooth face 15b of the third drive gear 15, and a solid line L4 indicates the load curve of the tooth face 16b of the third driven gear 16. As shown in this drawing, the respective load curves L3 and L4 change in gradient in transition regions Ai1 and Ai2 that are located halfway. In the respective load curves L3 and L4 shown in this drawing, the sizes of plateau regions Ap1 and Ap2 that are located to the left of the transition regions Ai1 and Ai2 in the drawing are correlated with the area of the smooth portions 30a of the respective tooth faces 15b and 16b. Besides, the sizes of valley regions Av1 and Av2 that are located to the right of the transition regions Ai1 and Ai2 are correlated with the area of the concavities 31 of the respective tooth faces 15b and 16b. As shown in this drawing, a normal probability Rqp1 of an intersection point between an asymptotic line of the plateau region Ap1 of the third drive gear 15 and an asymptotic line of the valley region Av1 of the third drive gear 15 is lower than a normal probability Rqp2 of an intersection point between an asymptotic line of the plateau region Ap2 of the third driven gear 16 and an asymptotic line of the valley region Av2 of the third driven gear 16. Thus, the smooth portions 30a of the tooth face 15b of the third drive gear 15 are smaller in area than the smooth portions 30a of the tooth face 16b of the third driven gear 16, and the concavities 31 (the tooth face which is other than the smooth portions 30a) of the tooth face 15b of the third drive gear 15 are larger in area than the concavities 31 of the tooth face 16b of the third driven gear 16.

As described above, both the tooth face 15b of the third drive gear 15 and the tooth face 16b of the third driven gear 16 have plateau-structure surfaces, but are different in the area and shape of the concavities 31 from each other. Hereinafter, a plateau-structure surface with the depth of the concavities 31 greater than a predetermined value and the area of the concavities 31 larger than the area of the smooth portions 30a, such as the tooth face 15b of the third drive gear 15, will be referred to as a first plateau-structure surface. Besides, a plateau-structure surface with the depth of the concavities 31 smaller than a predetermined value and the area of the concavities 31 smaller than the area of the smooth portions 30a, such as the tooth face 16b of the third driven gear 16, will be referred to as a second plateau-structure surface. Incidentally, as described above, the reduced peak heights Rpk of both the first plateau-structure surface and the second plateau-structure surface are smaller than 1.0 µm, and desirably smaller than 0.1 µm. In order to thus make the area and shape of the concavities 31 different, for example, the particle size or the like of a shot material used for a shot peening treatment may be changed.

The other gear pairs of the transmission 1 will be described. The second gear pair G2 and the fourth gear pair G4 are subjected to the treatment in the same manner as the third gear pair G3. That is, the entire tooth face of each of the teeth of each of the drive gears 13 and 17 is subjected to such a treatment that the surface thereof becomes the first plateau-structure surface, and the entire tooth face of each of the teeth of each of the driven gears 14 and 18 is subjected to such a treatment that the surface thereof becomes the second plateau-structure surface. Thus, each of the drive gears 13, 15, and 17 of the second to fourth gear pairs G2 to G4 is regarded as an example of one toothed wheel of the invention, and each of the driven gears 14, 16, and 18 is regarded as an example of the other toothed wheel of the invention. In addition, the entire tooth face of each of these gears 13 to 18 is regarded as an example of the plateau portion of the invention.

On the other hand, as for the first gear pair G1, the tooth face of each of the teeth of both the first drive gear 11 and the first driven gear 13 is subjected to such a treatment that the surface thereof becomes the first plateau-structure surface. In addition, as for the fifth gear pair G5 and the sixth gear pair G6, the tooth face of each of the teeth of both the respective drive gears 19 and 21 and the respective driven gears 20 and 22 is subjected to such a treatment that the surface thereof becomes the second plateau-structure surface. As described above, in the transmission 1, the tooth face of each of the teeth of all the respective gears at a first shift speed, namely, a low shift speed is the first plateau-structure surface. Besides, at second to fourth shift speeds, namely, intermediate shift speeds, the tooth face of each of the teeth of the drive gears is the first plateau-structure surface, and the tooth face of each of the teeth of the driven gears is the second plateau-structure surface. In addition, the tooth face of each of the teeth of all the respective gears at fifth and sixth shift speeds, namely, high shift speeds is the second plateau-structure surface.

Figure 7:
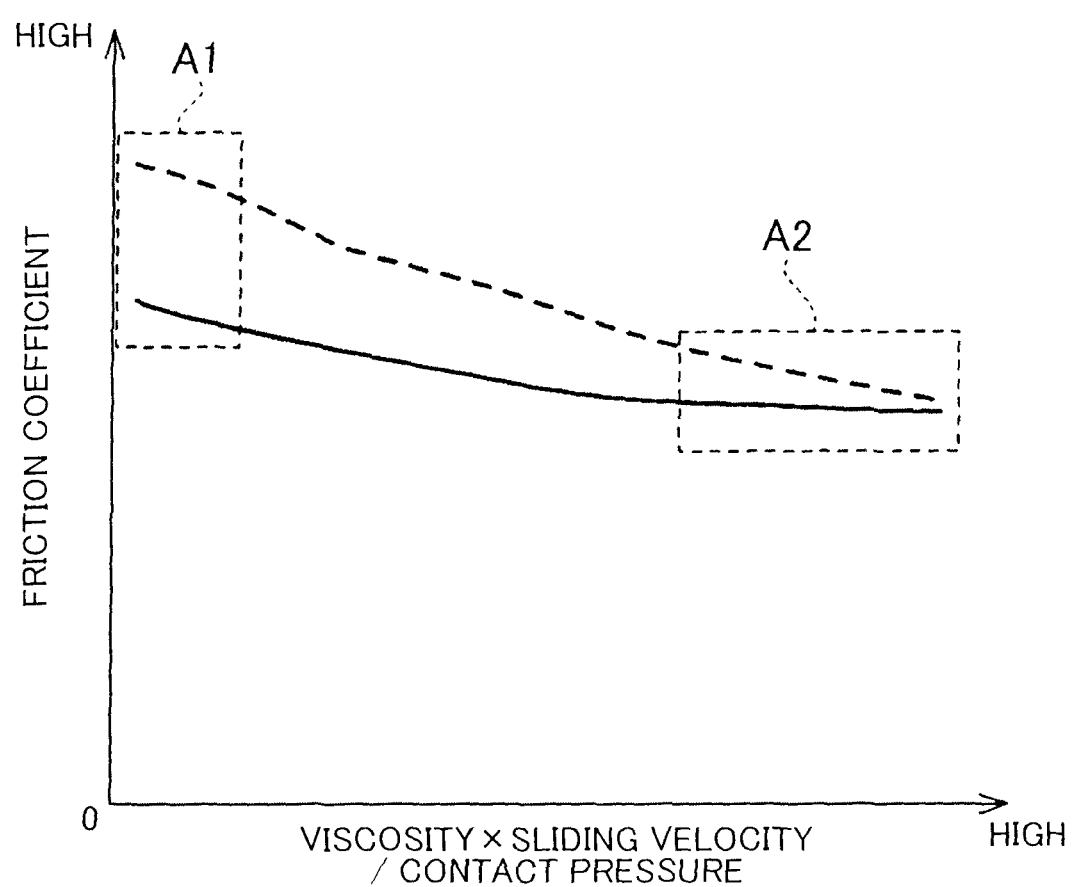
FIG. 7 is a view showing a relationship between (viscosity of oil/sliding velocity)/contact pressure and friction coefficient in between a first drive gear and a first driven gear.

FIG. 7 shows a relationship between (viscosity of oil×sliding velocity)/contact pressure and friction coefficient in between the first drive gear 11 and the first driven gear 12. Incidentally, in this drawing, a relationship between (viscosity of oil×sliding velocity)/contact pressure and friction coefficient in the case where the tooth faces of these gears 11 and 12 are not treated at all is indicated by a broken line as a comparative example. As is apparent from this drawing, when each tooth face of each of the gears 11 and 12 is formed as the first plateau-structure surface, the friction coefficient decreases. Especially in a boundary lubrication region A1 where the value of (viscosity of oil×sliding velocity)/contact pressure is low, the friction coefficient greatly decreases. In this boundary lubrication region A1, since the contact pressure is high, the oil in the concavities 31 is discharged to the outside and supplied to the gaps between the tooth faces. As described above, the concavities 31 are great in depth and large in area on the first plateau-structure surface, so that the amount of oil accumulated in the concavities 31 is large. Since this oil is supplied to the gaps between the tooth faces in the boundary lubrication region A1, the friction coefficient in the boundary lubrication region A1 decreases. In general, at the first shift speed, the rotational speed of the input shaft 2 is lower, and the torque to be transmitted between the gears is larger than at the intermediate shift speeds or the high shift speeds. Thus, the frequency with which the first gear pair G1 operates in the boundary lubrication region A1 is high. Therefore, the friction coefficient can be reduced by forming each tooth face of each of the gears 11 and 12 of the first gear pair G1 as the first plateau-structure surface.

Figure 8:
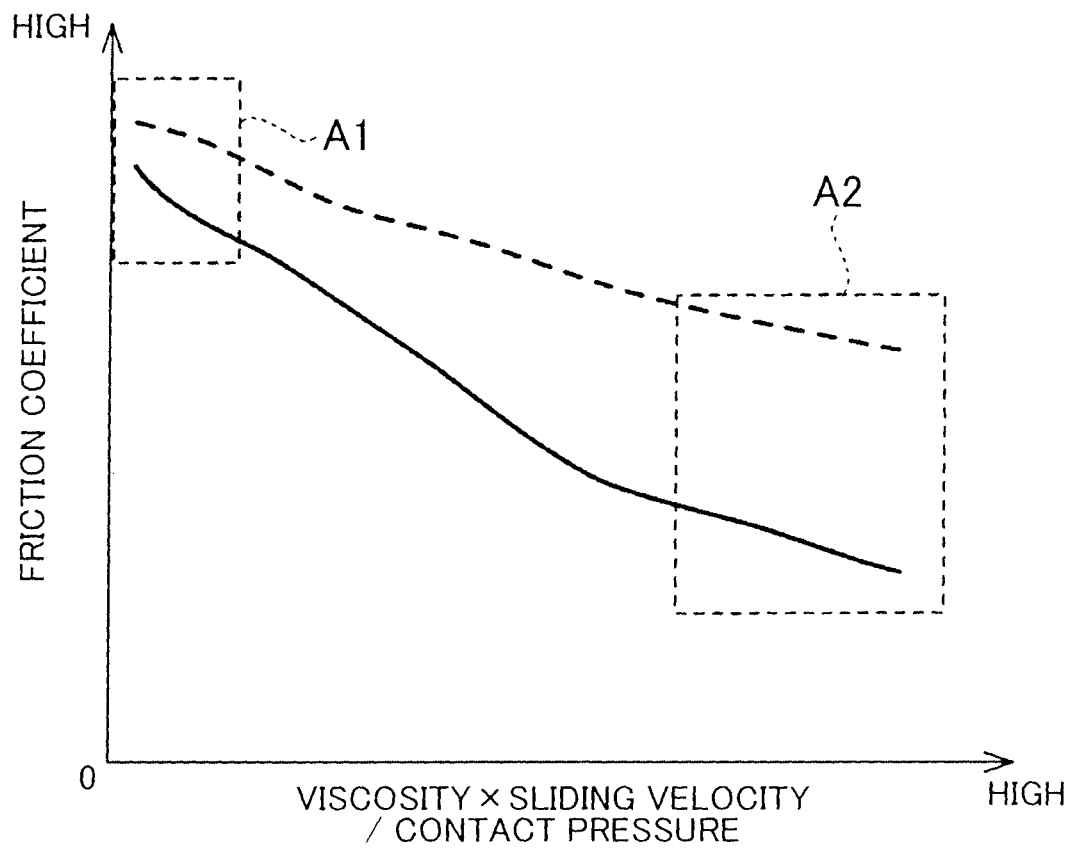
FIG. 8 is a view showing a relationship between (viscosity of oil/sliding velocity)/contact pressure and friction coefficient in between a fifth drive gear and a fifth driven gear.

FIG. 8 shows a relationship between (viscosity of oil×sliding velocity)/contact pressure and friction coefficient between the fifth drive gear 19 and the fifth driven gear 20. Incidentally, in this drawing as well, a relationship between (viscosity of oil×sliding velocity)/contact pressure and friction coefficient in the case where each tooth face of these gears 19 and 20 is not treated at all is indicated by a broken line as a comparative example. As shown in this drawing, when each tooth face of each of the gears 19 and 20 is formed as the second plateau-structure surface, the friction coefficient decreases. Especially in a mixed lubrication region A2 where the value of (viscosity of oil×sliding velocity)/contact pressure is high, the friction coefficient greatly decreases. In this mixed lubrication region A2, since the contact pressure is low, an oil film is formed between the tooth faces. As described above, the concavities 31 are small in depth and the smooth portions 30a are large in area on the second plateau-structure surface, so that the oil film between the tooth faces can be appropriately maintained. Thus, the friction coefficient in the mixed lubrication region A2 decreases. In general, at the fifth shift speed, the rotational speed of the input shaft 2 is higher, and the torque to be transmitted between the gears is smaller than at the low shift speed and the intermediate shift speeds. Thus, the frequency with which the fifth gear pair G5 operates in the mixed lubrication region A2 is high. Thus, the friction coefficient can be reduced by forming each tooth face of each of the gears 19 and 20 of the fifth gear pair G5 as the second plateau-structure surface. The sixth gear pair G6 is similar to the fifth gear pair G5. Therefore, the friction coefficient of the sixth gear pair G6 can also be reduced in a similar manner.

Figure 9:
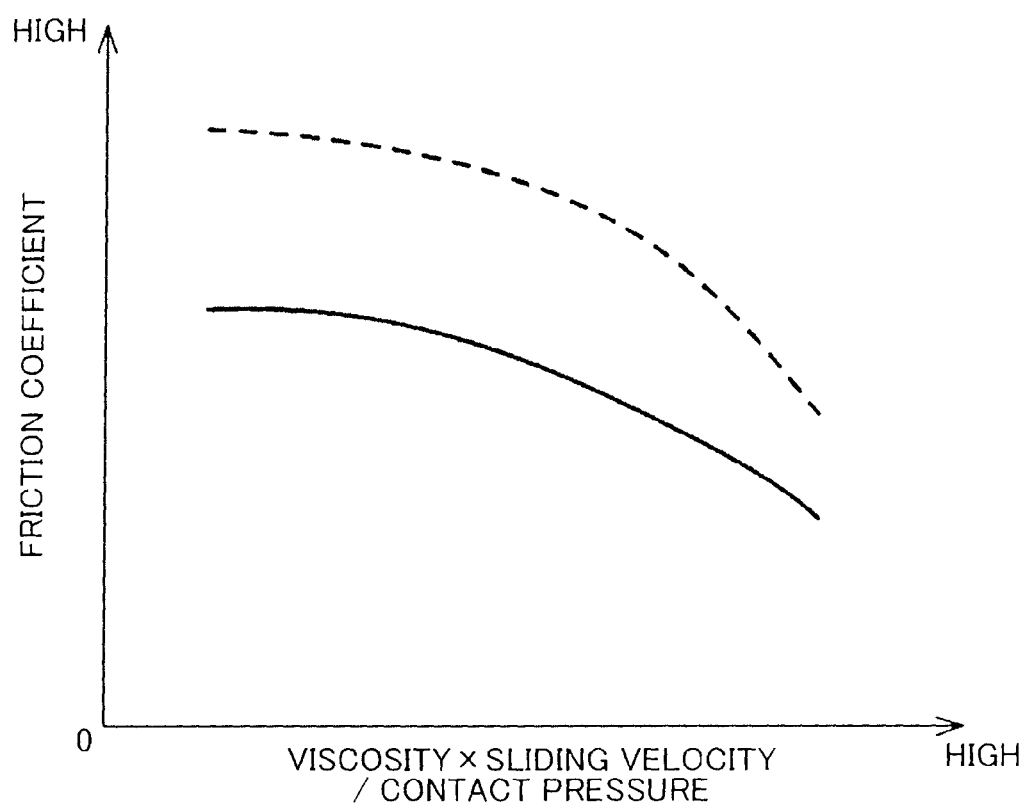
FIG. 9 is a view showing a relationship between (viscosity of oil/sliding velocity)/contact pressure and friction coefficient in between the third drive gear and the third driven gear.

FIG. 9 shows a relationship between (viscosity of oil× sliding velocity)/contact pressure and friction coefficient between the third drive gear 15 and the third driven gear 16. Incidentally, in this drawing as well, a relationship between (viscosity of oil×sliding velocity)/contact pressure and friction coefficient in the case where each tooth face of each of these gears 15 and 16 is not treated at all is indicated by a broken line as a comparative example. The axis of abscissa of this drawing is shown on a logarithmic scale. As is apparent from this drawing, in the third gear pair G3, each tooth face of the third drive gear 15 is the first plateau-structure surface, and each tooth face of the third driven gear 16 is the second plateau-structure surface. Therefore, the friction coefficient greatly decreases in a lubrication region ranging from the boundary lubrication region A1 to the mixed lubrication region A2. In general, the third shift speed is used in a wider rotational speed range ranging from low rotational speed to high rotational speed than the low shift speed or the high shift speeds. Besides, the range of the torque to be transmitted between the gears is wide, too. Thus, the friction coefficient can be reduced in the entire operation range by thus forming each tooth face of the third drive gear 15 as the first plateau-structure surface, and each tooth face of the third driven gear 16 as the second plateau-structure surface. Incidentally, the second gear pair G2 and the fourth gear pair G4, which are also included in the intermediate shift speeds, are similar to the third gear pair G3. Therefore, the friction coefficient of these gear pairs G2 and G4 can also be reduced in a similar manner.

As described above, according to the invention, the friction coefficient of the second to fourth gear pairs G2 to G4 can be reduced in a lubrication region ranging from the boundary lubrication region A1 to the mixed lubrication region A2. Thus, the friction coefficient can be reduced in a state where all these gear pairs G2 to G4 are in operation. Besides, the reduced peak height Rpk of each of the gears of these gear pairs G2 to G4 is set smaller than 1.0 μm, so that the surface quality of each tooth face is unlikely to change depending on the operation time. In this case, the surface quality hardly changes due to the running-in of each tooth face, so that a low friction coefficient can be maintained since the beginning of use. Besides, since the surface quality can thus be restrained from changing, the first plateau-structure surface or the second plateau-structure surface can be maintained. Furthermore, in the invention, the oil film can be formed on each tooth face in an entire operation state since the beginning of use. Therefore, pitching or a damage to each tooth face such as fatigue or the like, is unlikely to occur. Thus, the durability of the toothed wheels is enhanced.

In the transmission 1 in accordance with the invention, each tooth face of each of the gears 11 and 12 of the first gear pair G1 is formed as the first plateau-structure surface. The lubrication state between the tooth faces of the first gear pair G1 is the boundary lubrication state in the entire operation region. Therefore, the friction coefficient can be reduced. Besides, as for the gear pairs G5 and G6 at the high shift speeds, each tooth face of both the gears is formed as the second plateau-structure surface. The lubrication state between the tooth faces of these gear pairs G5 and G6 is the mixed lubrication state in the entire operation region. Therefore, the friction coefficient of these gears can also be reduced. In this manner, the friction coefficient of all the shift speeds can be reduced in the transmission 1, so that the friction loss can be reduced. Thus, the transmission efficiency of torque can be enhanced.

The invention is not limited to the foregoing embodiment thereof, but can be carried out in various forms. For example, each tooth face of the drive gears of the second to fourth gear pairs may be formed as the second plateau-structure surface, and each tooth face of the driven gears of the second to fourth gear pairs may be formed as the first plateau-structure surface. That is, in the invention, each tooth face of one of the drive gear and the driven gear of these gear pairs may be formed as the first plateau-structure surface, and each tooth face of the other gear may be formed as the second plateau-structure surface. In this case as well, the friction coefficient can be reduced in the lubrication region ranging from the boundary lubrication region to the mixed lubrication region.

In the transmission in accordance with the invention, each tooth face of one of the gears of the gear pairs at all the shift speeds may be formed as the first plateau-structure surface, and each tooth face of the other gear may be formed as the second plateau-structure surface. Besides, each tooth face of each of the gears of only at least one of the gear pairs may be formed as a plateau-structure surface, and each tooth face of each of the gears of the other gear pairs may not be subjected to such a treatment that the surface thereof becomes a plateau-structure surface. The number of forward shift speeds of the transmission to which the invention is applied is not limited to six. The invention may be applied to a transmission having five or less forward shift speeds, or to a transmission having seven or more forward shift speeds. Incidentally, the shift speeds included in the low shift speed, the intermediate shift speed, and the high shift speed are appropriately changed in accordance with the number of forward shift speeds. For example, in a transmission having eight shift speeds, the first shift speed and the second shift speed are low shift speeds, and the third to fifth shift speeds are intermediate shift speeds. In addition, the sixth to eighth shift speeds are high shift speeds. In the transmission in accordance with the invention, the shaft provided with the sleeves is not limited to the input shaft. The output shaft may be provided with all the sleeves. Besides, the input shaft may be provided with at least one of the sleeves, and the output shaft may be provided with the other sleeves.

The toothed wheels to which the invention is applied are not limited to helical gears. For example, the invention may be applied to various toothed wheels, for example, spur gears, double-helical gears, bevel gears and the like. The material of the toothed wheels in accordance with the invention is not limited to thermally treated iron. Various materials such as steel or aluminum and the like may be used as the material of the toothed wheels in accordance with the invention. Besides, the material of one toothed wheel may be made different from the material of the other toothed wheel. Incidentally, in this case, the materials may be selected such that the hardness of the teeth of one toothed wheel becomes equal to the hardness of the teeth of the other toothed wheel. In the invention, the range of each tooth face that is formed as a plateau-structure surface is not limited to the entire tooth face. For example, only the central region of each tooth face in the direction of the axis of rotation may be formed as a plateau-structure surface.

The toothed wheels in accordance with the invention may be applied not only to transmissions but also to various devices that transmit power using a pair of toothed wheels. Besides, the toothed wheels in accordance with the invention may be applied to mechanisms that employ a plurality of toothed wheels, such as planetary gear mechanisms and the like. In this case, for example, each of the tooth faces of a sun gear and a ring gear may be formed as a first plateau-structure surface, and each tooth face of a planetary gear may be formed as a second plateau-structure surface.

The invention claimed is:

1. A pair of toothed wheels that mesh with each other, comprising:
   each tooth face of each of the pair of the toothed wheels including a plateau portion, a surface of the plateau portion being a plateau-structure surface, the plateau-structure surface having a plurality of concavities and a plurality of convexities, and peak portions of the plurality of convexities being flat, wherein
   a reduced valley depth of the plurality of concavities of the plateau portion of one of the pair of the toothed wheels is greater than a reduced valley depth of the plurality of concavities of the plateau portion of the other of the pair of the toothed wheels, and
   an area occupied by the plurality of concavities in the plateau portion of the one of the toothed wheels is larger than an area occupied by the plurality of concavities in the plateau portion of the other toothed wheel.

2. The toothed wheels according to claim 1, wherein reduced peak heights of both the plateau portion of the one of the toothed wheels and the plateau portion of the other toothed wheel are smaller than 1.0 μm.

3. The toothed wheels according to claim 1, wherein a hardness of teeth of the one of the toothed wheels is equal to a hardness of teeth of the other toothed wheel.

4. The toothed wheels according to claim 1, wherein the area occupied by the concavities in the plateau portion is an area other than the area of the peak portions of the plateau portion.

5. A transmission comprising:
   an input shaft;
   an output shaft; and
   a plurality of gear pairs that are interposed between the input shaft and the output shaft and are different in speed ratio from each other, wherein
   the input shaft is provided with one of toothed wheels of each of the plurality of the gear pairs,
   the output shaft is provided with the other toothed wheel of each of the plurality of the gear pairs such that the other toothed wheel meshes with the one toothed wheel,
   a changeover in speed ratio is made by selectively achieving transmission of rotation by one of the plurality of the gear pairs, and
   the toothed wheels according to claim 1 are provided as at least one of the plurality of the gear pairs.

6. The transmission according to claim 5, wherein the plurality of the gear pairs include a gear pair at an intermediate shift speed, a gear pair at a low shift speed which is higher in speed ratio than the gear pair at the intermediate shift speed, and a gear pair at a high shift speed which is lower in speed ratio than the gear pair at the intermediate shift speed, and
   the toothed wheels are provided as the gear pair at the intermediate shift speed.

7. The transmission according to claim 6, wherein the plateau portion includes a first plateau portion and a second plateau portion,
   the first plateau portion is provided on each tooth face of each toothed wheel of the gear pair at the low shift speed,
   the second plateau portion is provided on each tooth face of each toothed wheel of the gear pair at the high shift speed,
   the reduced valley depth of the first plateau portion is greater than a predetermined value, and an area occupied by concavities in the first plateau portion is larger than an area occupied by the peak portions of the convexities on the first plateau portion, and
   the reduced valley depth of the second plateau portion is smaller than the predetermined value, and an area occupied by the peak portions of the convexities on the second plateau portion is larger than an area occupied by the concavities in the second plateau portion.

8. The toothed wheels according to claim 1, wherein the pair of toothed wheels rotate about separate shafts.

* * * * *